(No Model.)
C. H. KIERTER.
MECHANISM FOR UTILIZING WAVE POWER.
No. 341,021. Patented May 4, 1886.
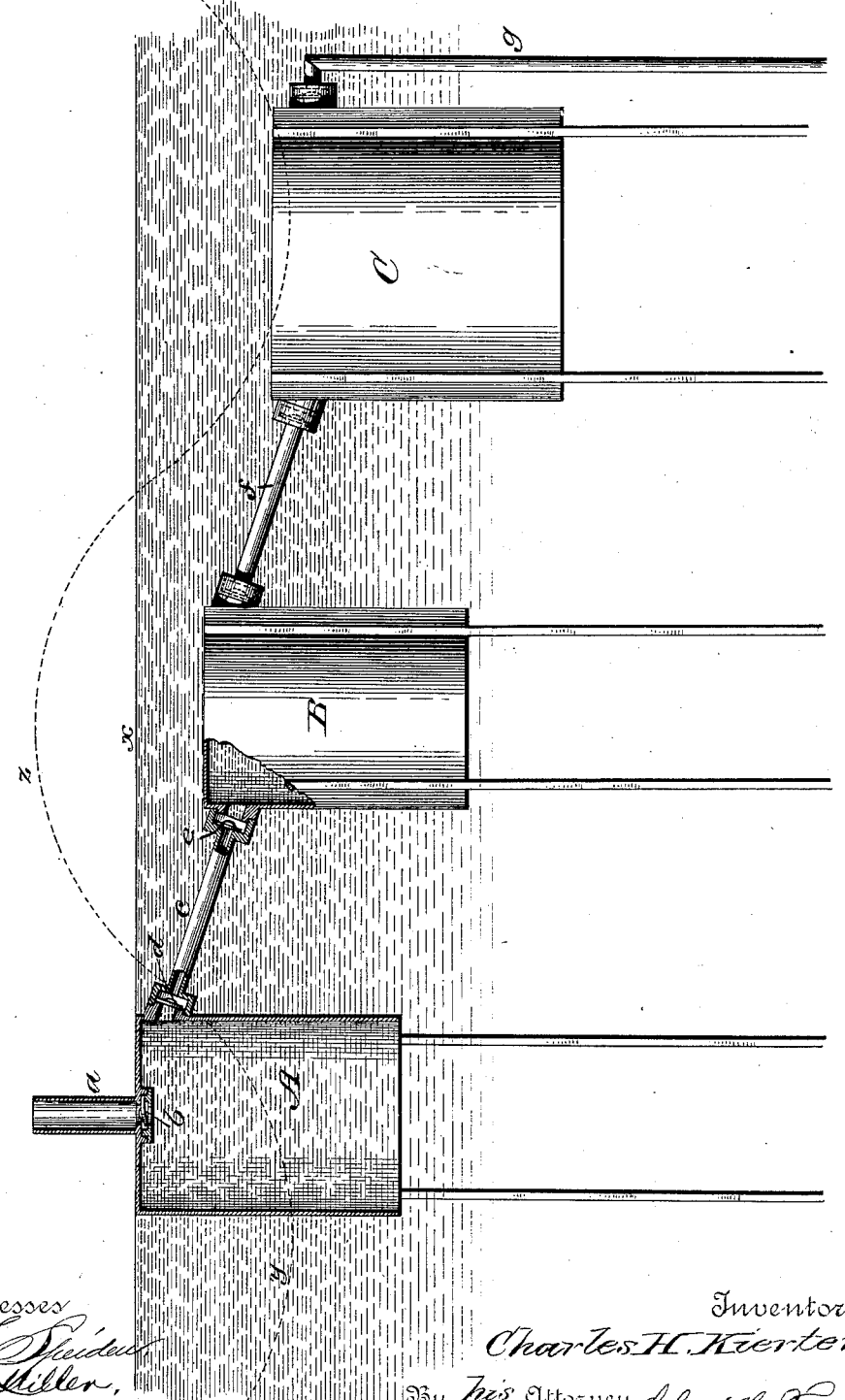

UNITED STATES PATENT OFFICE.

CHARLES H. KIERTER, OF MILL BROOK, OHIO.

MECHANISM FOR UTILIZING WAVE-POWER.

SPECIFICATION forming part of Letters Patent No. 341,021, dated May 4, 1886.

Application filed November 30, 1885. Serial No. 184,318. (No model.)

*To all whom it may concern:*

Be it known that I, CHARLES H. KIERTER, a citizen of the United States, residing at Mill Brook, in the county of Wayne and State of Ohio, have invented certain new and useful Improvements in Mechanisms for Utilizing Wave-Power; and I do hereby declare that the following is a full, clear, and exact description of the same, reference being had to the annexed drawing, making a part of this specification, and to the letters and figures of reference marked thereon.

The object of the present invention is to provide means whereby wave-power can be utilized for the purpose of compressing air to be used for motor and other purposes and for ventilation in shafts and mines, as will be hereinafter described and claimed.

In the accompanying drawing, which represents a side view of my invention partly in section, A designates a cylinder of any suitable dimensions, open at its bottom and closed at its top, as shown. This cylinder or vessel A is placed in the water with its open end down and its closed top level with the surface of the water, the top of the vessel having a suitable tube, $a$, extending some distance above the same, and a downwardly-opening check-valve, $b$, forming communication between the tube and interior of the vessel when the valve is open.

The vessel A communicates with a vessel, B, by means of a pipe, $c$, and check-valves $d$ $e$, said vessel being of similar construction, but without the tube and valve at its top, and is placed in the water so that its closed top will be some distance below the surface of the water. This vessel B, by means of a pipe, $f$, and valves therein similar to those in pipe $c$, communicates with a closed reservoir, C, to receive the compressed air, which is taken therefrom through a pipe, $g$, also provided with a check-valve at the point of connection with the reservoir.

In the operation of my invention it should be understood that the water-level is represented at $x$, and the hollow and crest of the wave are shown at $y$ $z$, respectively, the course of the wave being illustrated by broken lines. When the hollow $y$ of the wave forms over the vessel A, said vessel will be exposed to the air in depth proportioned to the depth of the wave hollow, and the air will rush through the tube $a$, open the valve $b$ by the downward pressure thereon, and pass into the vessel to fill the vacuum caused by the descending water therein. When crest $z$ of the wave takes the place of hollow $y$, the valve $b$ will be closed by the upward pressure of air in the top of the vessel A, caused by the ascending water therein, and as the air is thus compressed it will open valve $d$, pass through pipe $c$, open valve $e$, and escape in the vessel B, as the coming hollow of the wave has now formed over said vessel, and the weight of water resting on it is less than that on the vessel A.

By the action described above any number of intermediate vessels, B, that may be found practicable may be employed, placing each additional one deeper in the water and the vessels diagonal to each other, so as to secure the full effect of the waves thereon when coming in any direction.

The reservoir C, it should be understood, is placed on a plane below all the vessels described above, and the air in the vessel next to it, as shown at B, enters the reservoir through a pipe, $f$, and valves placed therein similar to those in pipe $c$. From the reservoir C the air is taken through pipe $g$ to any place or places where required.

Should the vessel A be of such size or height that the depth of the hollow of the wave is deeper and comes below the open end thereof, the vessel A can fill with air at the bottom.

Having now fully described my invention, what I claim as new, and desire to secure by Letters Patent, is—

In a mechanism for utilizing wave-power in the compression of air, the combination of an air-compressing cylinder and a reservoir for receiving the compressed air of one or more intermediate cylinders, the cylinders having open ends communicating with each other through pipes provided with check-valves and with the reservoir, and arranged below the water-level on different horizontal planes, substantially as and for the purpose set forth.

In testimony that I claim the above I have hereunto subscribed my name in the presence of two witnesses.

CHARLES H. KIERTER.

Witnesses:
W. S. BATTLES,
W. W. WISE.